United States Patent
Zhang et al.

(10) Patent No.: US 12,499,559 B2
(45) Date of Patent: Dec. 16, 2025

(54) PHOTOGRAPHING METHOD AND APPARATUS, MEDIUM AND CHIP

(71) Applicant: Beijing Xiaomi Mobile Software Co., Ltd., Beijing (CN)

(72) Inventors: Yuqian Zhang, Beijing (CN); Chaoyu Feng, Beijing (CN); Yu Liang, Beijing (CN); Yiwei Wang, Beijing (CN); Pan Ye, Beijing (CN); Lei Lei, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 505 days.

(21) Appl. No.: 17/977,423

(22) Filed: Oct. 31, 2022

(65) Prior Publication Data

US 2024/0005521 A1    Jan. 4, 2024

(30) Foreign Application Priority Data

Jul. 4, 2022   (CN) .......................... 202210788540.5

(51) Int. Cl.
| | |
|---|---|
| *G06T 7/215* | (2017.01) |
| *H04N 23/71* | (2023.01) |
| *H04N 23/73* | (2023.01) |

(52) U.S. Cl.
CPC ............. *G06T 7/215* (2017.01); *H04N 23/71* (2023.01); *H04N 23/73* (2023.01)

(58) Field of Classification Search
CPC ........ G06T 7/215; H04N 23/71; H04N 23/73; H04N 23/64; H04N 23/6811

USPC .......................................................... 382/107
See application file for complete search history.

(56) References Cited

U.S. PATENT DOCUMENTS

| | | | |
|---|---|---|---|
| 2005/0057666 A1* | 3/2005 | Hu ......................... | H04N 25/76 348/E5.037 |
| 2018/0032797 A1* | 2/2018 | Lee ..................... | G06V 40/172 |
| 2020/0304709 A1* | 9/2020 | Han ..................... | H04N 23/611 |
| 2022/0138964 A1 | 5/2022 | Gintsburg et al. | |

FOREIGN PATENT DOCUMENTS

WO        2019/237992 A1      12/2019

OTHER PUBLICATIONS

Extended European Search Report issued Jun. 30, 2023 for European Patent Application No. 22204732.6.

* cited by examiner

*Primary Examiner* — Stephen P Coleman
(74) *Attorney, Agent, or Firm* — Volpe Koenig (57) ABSTRACT

A photographing method, including: obtaining a preview stream; detecting a movement speed of a photographed subject according to the preview stream; obtaining a first exposure time by shortening, according to the movement speed, an initial exposure time for preview frames in the preview stream, in response to determining that the movement speed is higher than a preset speed threshold; and capturing a picture based on the first exposure time.

18 Claims, 5 Drawing Sheets

PHOTOGRAPHING METHOD AND APPARATUS, MEDIUM AND CHIP

CROSS REFERENCE TO RELATED APPLICATIONS

The present application claims the benefit of priority to Chinese Application No. 202210788540.5, filed on Jul. 4, 2022, the contents of which are incorporated herein by reference in their entirety for all purposes.

BACKGROUND

In related art, when photographing at night with dimmer light, the shutter time is usually set longer in order to ensure the brightness of a picture, restore more details of the texture, and restore the color saturation of a photographed scene.

SUMMARY

The disclosure provides a photographing method and apparatus, a medium, and a chip.

According to a first aspect of examples of the disclosure, there is provided a photographing method, including: obtaining a preview stream; detecting a movement speed of a photographed subject according to the preview stream; obtaining a first exposure time by shortening, according to the movement speed, an initial exposure time for preview frames in the preview stream, in response to determining that the movement speed is higher than a preset speed threshold; and capturing a picture based on the first exposure time.

According to a second aspect of examples of the disclosure, there is provided a photographing apparatus, including: an obtaining module configured to obtain a preview stream; a detecting module configured to detect a movement speed of a photographed subject according to the preview stream; an adjusting module configured to obtain a first exposure time by shortening, according to the movement speed, an initial exposure time for preview frames in the preview stream in response to determining that the movement speed is higher than a preset speed threshold; and a processing module configured to capture a picture based on the first exposure time.

According to a third aspect of the disclosure, there is provided a photographing apparatus, including a processor and a memory configured to store an instruction executable by the processor, where the processor is configured to execute steps of the method according to any one of the items in the first aspect.

According to a fourth aspect of the disclosure, there is provided a non-transitory computer-readable storage medium that stores a computer program instruction where, when executed by a processor, the program instruction implements steps of the method according to any one of the items in the first aspect.

According to a fifth aspect of the disclosure, there is provided a chip, including a processor and an interface, where the processor is configured to read an instruction and execute the method according to any one of the items in the first aspect.

It is to be understood that both the foregoing general description and the following detailed description are illustrative and explanatory and are not restrictive of the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the disclosure.

DETAILED DESCRIPTION

Description will be made in detail with examples, which are illustrated in the accompanying drawings. When the following description relates to the accompanying drawings, the same numbers in different accompanying drawings refer to the same or similar elements unless otherwise indicated. The implementation described in the following examples does not represent all implementations consistent with the disclosure. Instead, they are merely instances of apparatuses and methods consistent with some aspects of the disclosure as detailed in the appended claims.

It is to be noted that in the disclosure, all actions related to obtaining a signal, information, or data are performed under the premise of complying with corresponding data protection laws and regulations of the country where they are located and obtaining the authorization given by an owner of a corresponding apparatus.

In related art, when photographing at night with dimmer light, the shutter time is usually set longer in order to ensure the brightness of a picture, restore more details of the texture, and restore the color saturation of a photographed scene. However, in the case that a moving object is photographed at night, the longer the shutter time, the blurrier the picture photographed, and a subject (that is, the moving subject) in the captured picture will have serious ghost and smear, and a yield of the captured pictures is low, which seriously affects the user experience.

Figure 1:
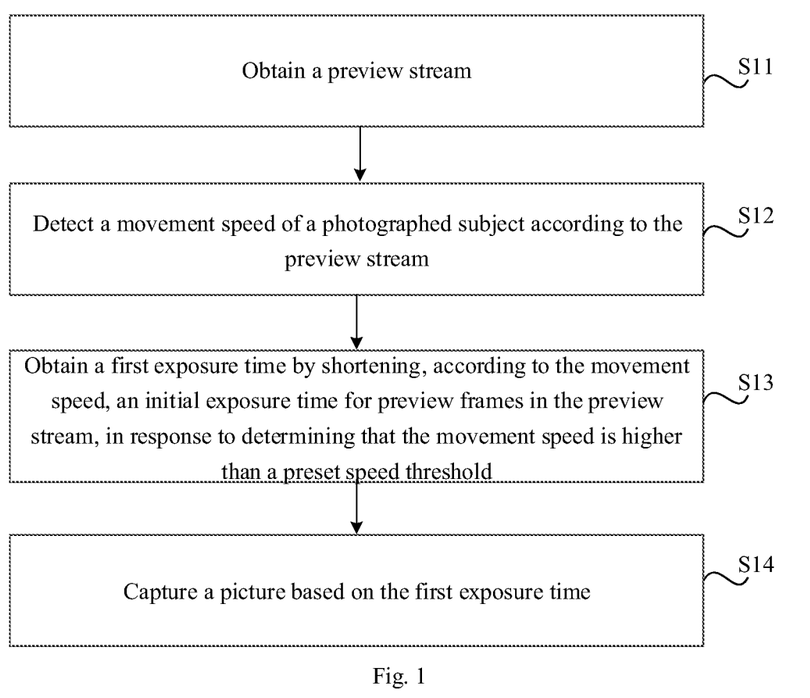
FIG. 1 is a flowchart of a photographing method according to an example.

FIG. 1 is a flowchart of a photographing method according to an example. The photographing method may be applied to any terminal with a photographing function, for instance, a mobile phone, a tablet computer, an iPad, etc. As shown in FIG. 1, the photographing method includes the following steps of S11 to S14.

In S11, obtaining a preview stream.

The preview stream refers to a data stream where a user previews a scene to be photographed after the photographing function of the terminal is turned on.

In S12, detecting a movement speed of a photographed subject according to the preview stream.

The photographed subject refers to a main object to be photographed, for instance, a person, an animal, a vehicle in motion, etc.

In some examples, detecting the movement speed of the photographed subject according to the preview stream may be implemented through determining a change between preview frames in the preview stream, and determining the movement speed of the photographed subject based on the change. For instance, the change between the preview frames may be determined by detecting different positions of the photographed subject in different preview frames.

Moreover, determining the movement speed of the photographed subject based on the change may include: determining the movement speed of the photographed subject based on the changes and weights corresponding to different areas of the preview frames, where a weight corresponding to the areas, having the photographed subject, of the preview frames is larger than a weight corresponding to the areas, having no photographed subject, of the preview frames. Different weights are used for different areas in the preview frames, that is, the weight of the area in which the photographed subject is located is increased and the weights of other areas are reduced, such that the movement detection pays more attention to the movement area in which the photographed subject is located, to prevent false detection and missing detection of movement detection, and improve accuracy of movement detection. For instance, assuming that each preview frame is divided into area 1, area 2, area 3, and area 4 with corresponding weights a1, a2, a3, and a4, respectively, and that the photographed subject is located in area 1, a1 may be set to be greater than a2, a3, and a4. After the change corresponding to each area is determined, the changes and the weights corresponding to the different areas may be weighted to obtain the movement speed of the photographed subject. For instance, assuming that change speeds corresponding to area 1, area 2, area 3, and area 4 are v1, v2, v3, and v4, respectively, the movement speed of the photographed subject is a1×v1+a2×v2+a3×v3+a4×v4.

The movement speed of the photographed subject, obtained through the above-mentioned weighting process, is based on a movement speed obtained from two consecutive preview frames. However, in some examples, a final movement speed may be obtained by smoothing the movement speed determined based on N consecutive preview frames. Take consecutive preview frame 1, preview frame 2, preview frame 3, and preview frame 4 as an example. A movement speed 1 is determined based on preview frame 1 and preview frame 2, a movement speed 2 is determined based on preview frame 2 and preview frame 3, a movement speed 3 is determined based on preview frame 3 and preview frame 4. The movement speed 1, the movement speed 2, and the movement speed 3 are smoothed by taking their mean value, their mean square value, etc., to obtain the final movement speed, such that false detection and missing detection of movement detection may be prevented, and the accuracy of the determined movement speed is higher.

Moreover, too dark pictures of the preview frames are liable to cause false movement detection. Too dark pictures of the preview frames are usually caused by dark ambient brightness. For instance, in a nighttime scene or a daytime cloudy scene, due to the ambient brightness being too dark, the pictures in the preview frames are too dark. Thus, before determining the change between the preview frames, the method according to the examples of the disclosure may further include: determining area brightnesses corresponding to different areas of the preview frames; and performing a self-adaptive brightening operation on an area having the area brightness lower than a second brightness, the second brightness being a threshold brightness tending to cause false detection of the movement speed. That is, in response to determining that the area brightness is lower than the second brightness, which indicates that the brightness of the area is too low and is liable to cause false movement detection, the brightness of the area is increased by performing self-adaptive brightening operation on the area, effectively eliminating an influence of insufficient scene information in a dark environment, preventing false detection and missing detection of movement detection, and guaranteeing a more accurate movement speed to be detected.

In some examples, detecting the movement speed of the photographed subject according to the preview stream may be implemented through evaluating a movement state of the photographed subject in the preview frames through a deep learning method and determining the movement speed of the photographed subject based on an evaluation result. Thus, a more accurate movement speed may be detected.

In S13, in response to determining that the movement speed is higher than a preset speed threshold, which indicates that the movement speed of the photographed subject is high and the captured picture is prone to blur, smear, ghost etc., obtaining a first exposure time by shortening, according to the movement speed, an initial exposure time for preview frames in the preview stream.

The initial exposure time refers to a default exposure time when the photographing function of the terminal is turned on.

In some examples, the initial exposure time may be shortened according to a preset corresponding relationship between the movement speed and the exposure time. The preset corresponding relationship may be a preset corresponding table or a preset function correspondence, etc. For instance, assuming that in the preset corresponding table, the movement speed 1 corresponds to an exposure time p1, the movement speed 2 corresponds to an exposure time p2, etc., in response to determining that the movement speed of the photographed subject determined in S12 is the movement speed 2, the initial exposure time may be shortened to p2 in accordance with the preset corresponding table in S13.

In some examples, besides the movement speed of the photographed subject, the current ambient brightness is taken into consideration when the exposure time is shortened. For instance, the current ambient brightness and the movement speed of the photographed subject may be detected. In response to determining that the movement speed of the photographed subject is higher than the preset speed threshold and the current ambient brightness is lower than a first brightness, the initial exposure time for the preview frames in the preview stream is shortened according to the movement speed, and the manner for shortening is similar to the manner described above. The first brightness refers to a threshold brightness which influences the quality of the captured picture due to the ambient brightness, that is, in the case that the ambient brightness is greater than the first brightness, the ambient brightness has little or no influence on the quality of the captured picture, and in the case that the ambient brightness is less than the first brightness (for instance, at a night scene, a daytime cloudy scene, etc.), the ambient brightness has greater influence on the quality of the captured picture. In some examples, the current ambient brightness refers to the brightness of the current environment where the photograph is taken, and the current ambient brightness may be detected using a photometric parameter of the terminal. Through this configuration, the clarity of the photographed subject in the picture can be guaranteed even in a dark environment.

In S14, capturing a picture based on the first exposure time.

In some examples, S14 may be implemented in the following manner.

First, raw images are obtained based on the first exposure time. For instance, in response to determining that the terminal is still in a photographing preview stage after the exposure time is shortened, the preview frames may be obtained by using the first exposure time, and the obtained preview frames are cached into the terminal, such that the raw images are obtained. In response to determining that the user presses a shutter at a certain moment after the exposure time is shortened, the first exposure time is used for exposure, and the photograph is taken. Thus allowing the raw images to be obtained. That is, more than one short-exposure raw images are obtained by using the first exposure time.

Then, the captured picture is obtained by processing the raw images.

In some examples, in response to determining that the terminal uses a zero shutter lag (ZSL) mode for photographing, the raw images to be processed are from the cached preview frames or from the cached preview frames and the raw images photographed after the user presses the shutter. In response to determining that the terminal uses a conventional photographing mode, that is, a non-ZSL mode, the raw images to be processed are from the raw images photographed after the user presses the shutter.

According to the above technical solution, in the case that the movement speed of the photographed subject is higher than the preset speed threshold, which indicates that the current movement speed of the photographed subject is high, the initial exposure time for the preview frames in the preview stream is shortened according to the movement speed, so as to guarantee that the subject in the picture is clear. Thus, the problems of blur, smear, ghost, etc. occurring when the subject with a high movement speed is photographed are solved. Further, a user is enabled to capture a wonderful moment of the moving subject clearly, the clarity of the moving subject in imaging is guaranteed, and a yield of captured pictures is improved. Moreover, compared with a solution for prolonging a shutter time in the related art, the disclosure shortens the exposure time, so as to avoid jitter under a long exposure time (for instance, a too long exposure time is liable to cause hand tremble during handheld photographing), further a clearer output picture may be obtained, and the yield of the captured pictures is improved. The method according to the examples of the disclosure is suitable for improving the quality of the captured picture in various environments, such as scenes with high ambient brightness (e.g., sunny days), or low ambient brightness (e.g., nighttime, daytime cloudy days), etc.

In some examples, capturing the picture based on the first exposure time in S14 may include: obtaining the raw images by using the first exposure time; and obtaining the captured picture by processing the raw images based on a brightness range in which a current ambient brightness falls and whether a current scene is an abnormal scene that causes differences between the raw images. This will be described in detail below with reference to FIG. 2. The current ambient brightness refers to the brightness of the current environment where the photographing is located, and the current ambient brightness may be detected using a photometric parameter of the terminal.

By using the above technical solution, the brightness range in which the current ambient brightness falls, and the abnormal scene may be considered when the raw images are processed, such that influences of the brightness, the abnormal scene, etc. on a final processing result is avoided, so as to obtain a clearer output picture and improve the yield of the captured pictures.

Figure 2:
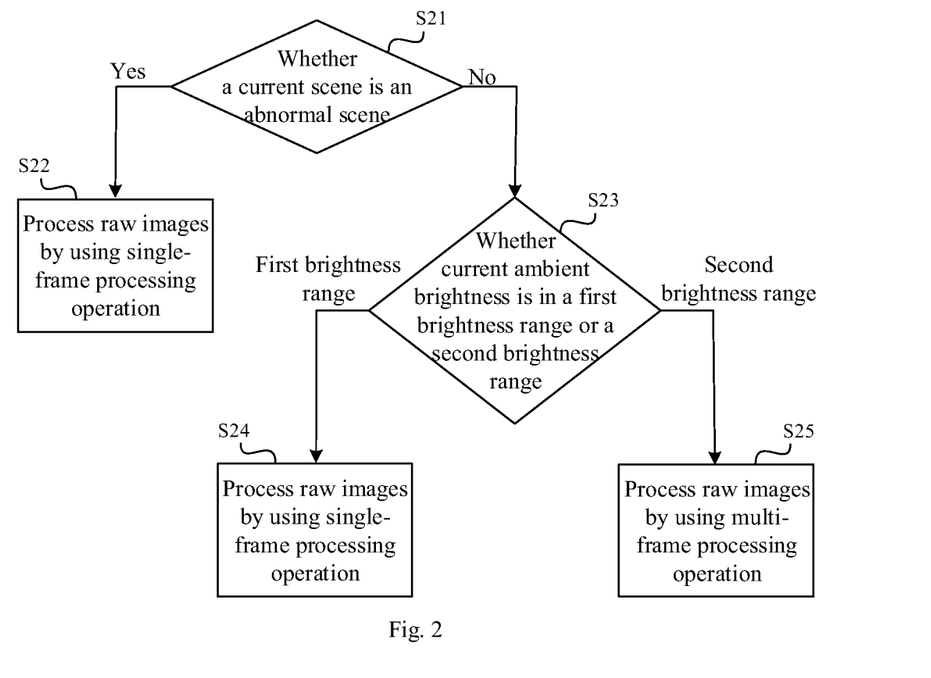
FIG. 2 is a flowchart showing processing of a raw image according to an example.

FIG. 2 is a flowchart for processing the raw images based on the brightness range in which the current ambient brightness falls and whether the current scene is an abnormal scene that causes differences between the raw images, according to an example. As shown in FIG. 2, the method includes the following steps of S21 to S25.

In S21, a determination is made whether the current scene is an abnormal scene. An abnormal scene is a scene that causes differences between the raw images. In response to determining that the current scene is an abnormal scene, S22 is executed, and in response to determining that the current scene is not an abnormal scene, S23 is executed.

An abnormal scene may include at least one of a brightness sudden-change scene and a jitter scene. The brightness sudden-change scene refers to a scene in which a brightness difference between the raw images is greater than a preset brightness difference. The jitter scene refers to a scene in which the terminal jitters.

The brightness sudden-change scene may be determined through the following examples. First, a mean brightness of a middle area of each raw image is determined, and the mean brightness is taken as a brightness of each raw image. For instance, the mean brightness of the middle area of an ith raw image is determined as the brightness of the ith raw image. The reason for using the mean brightness of the middle area of each raw image as the brightness of the raw image is that the raw image has a feature where the middle area is brighter and the periphery is darker. Then, a brightness difference between the raw images is determined. For instance, a brightness difference between the ith raw image and a jth raw image is determined. Then, in response to determining that the brightness difference is greater than the preset brightness difference, which indicates that there exists a brightness jump in the current environment, it may be determined that the current environment belongs to a brightness sudden-change scene.

A jitter scene may be determined through the following example. First, angular speed information of a movement sensor (for instance, a gyroscope, etc.) of the terminal is obtained. Then, whether the terminal jitters are determined based on the angular speed information. In response to determining that a change in angular speed is large, for instance, a difference between angular speeds is greater than a preset angular speed difference value, it is indicated that the terminal is in an unstable state, that is, in a jitter state. The jitter may cause a large difference in image content between more than one image.

In S22, since it is determined in S21 that the current scene is an abnormal scene, and the abnormal scene may cause differences between the raw images, an abnormal scene may influence the result of the multi-frame processing operation, the multi-frame processing operation referring to the operation of selecting more than one frame from the raw images for processing. Thus, the raw images are processed using a single-frame processing operation in the abnormal scene, where the single-frame processing operation refers to the operation of selecting one frame from the raw images for processing. In this way, the stability of the captured picture in the abnormal scene may be guaranteed, and the entire yield of the captured pictures is improved.

In S23, since it is determined in S21 that the current scene is not an abnormal scene, the brightness range in which the current ambient brightness falls is further determined, such that it may be decided whether to subsequently process the raw images by using the single-frame processing operation or the multi-frame processing operation based on a determination result of S23. The brightness range includes a first brightness range and a second brightness range, the ambient brightness in the first brightness range is greater than the ambient brightness in the second brightness range, the first brightness range refers to a brightness range in which enough details may be restored from one raw image obtained under the condition that the current ambient brightness is in the first brightness range, and the second brightness range refers to a brightness range in which enough details may not be restored from one raw image obtained under the condition that the current ambient brightness is in the second brightness range. For instance, the first brightness range may be a range in which the ambient brightness is greater than a fourth brightness and less than a first brightness, the second brightness range may be a range in which the ambient brightness is greater than a fifth brightness and less than the fourth brightness, the fourth brightness is a threshold brightness where enough details may be restored with one raw image, and the first brightness refers to a threshold brightness that influences the quality of the captured picture due to the ambient brightness. In another instance, the first brightness range may be a range where the ambient brightness is greater than the fourth brightness, and the second brightness range may be a range where the ambient brightness is less than the fourth brightness.

In response to determining that the current environment falls in the first brightness range, S24 is executed, and in response to determining that the current environment falls in the second brightness range, S25 is executed.

In S24, the raw images are processed using the single-frame processing operation, as the current scene is not an abnormal scene and the current ambient brightness is within the first brightness range. The single-frame processing operation may generate a resolution recovery effect substantially equivalent to the resolution recovery effect of the multi-frame processing operation in a relatively bright ambient illumination scene (that is, may restore image details substantially equivalent to the image details restored by the multi-frame processing operation). Thus, processing the raw images using the single-frame processing operation under this condition not only guarantees quick imaging in an environment having a low ambient brightness, but also preserves fine textures in the environment having low ambient brightness.

In S25, the raw images are processed using the multi-frame processing operation in response to determining that the current scene is not an abnormal scene and the current ambient brightness is within the second brightness range. In a relatively dark scene, more details can be restored by using the multi-frame processing operation, so as to not only guarantee quick imaging in an environment having a low ambient brightness, but also preserve fine textures in the environment having low ambient brightness.

According to the above technical solution, for an abnormal scene and different brightness ranges, different processing solutions for the raw images are used, so as to guarantee quick imaging and preserve fine textures, the problems of blur, smear, ghost, etc. occurring when the subject with a high movement speed is photographed in an abnormal scene and in a dark environment are solved, a user can be enabled to clearly capture a wonderful moment of the moving subject, clarity of the moving subject in imaging is guaranteed, and the yield of the captured pictures in the abnormal scene and in the dark environment is improved.

Figure 3:
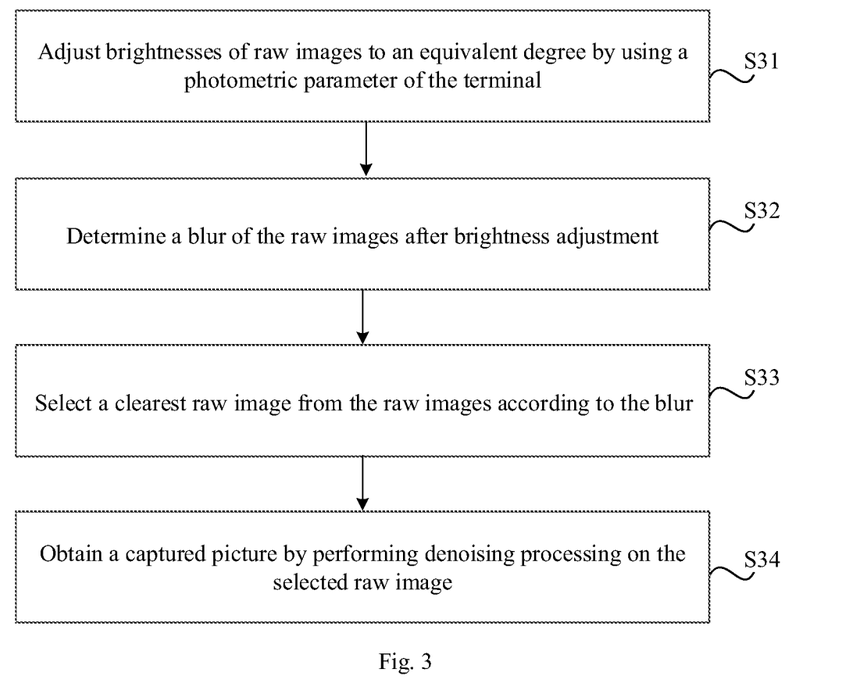
FIG. 3 is a flowchart showing single-frame processing operation according to an example.

FIG. 3 is a flowchart showing single-frame processing operation according to an example. As shown in FIG. 3, the single-frame processing operation includes the following steps of S31 to S34.

In S31, brightnesses of the raw images are adjusted to an equivalent degree by using a photometric parameter of the terminal. For instance, the brightnesses of the raw images are adjusted by using a gain value in the photometric parameter. By adjusting the brightnesses of the raw images to an equivalent degree, a brightness difference between the raw images may be eliminated, and the accuracy of blur computation in the subsequent steps is improved.

In S32, a blur of the raw images after brightness adjustment is determined.

In some examples, the blur may be determined by means of various algorithms. For instance, the blur is determined through at least one of a feature-pyramid-based blur computation method, a gradient-change-based blur computation method, a deep-learning-method-based blur computation method, etc. The gradient-change-based blur computation method refers to the computation of gradient changes in the raw images and the determination of the blur based on the gradient changes. In response to determining that an image contains more gradient changes, it means that the image contains more edge information, and the more edges there are, the clearer the image is. Compared with the gradient-change-based blur computation method, the computation result of the feature-pyramid-based blur computation method are more accurate. The deep-learning-method-based blur computation method may return image clarity.

In S33, a clearest raw image is selected from the raw images according to the blur. By selecting a frame based on the blur, a frame with a minimum blur value may be accurately selected, and the entire clarity of the captured pictures may be guaranteed.

In S34, the captured picture is obtained by performing denoising processing on the selected raw image.

In some examples, various denoising processing methods may be used. For instance, a deep learning network is used for AI denoising processing. Compared with a traditional denoising method, the AI denoising algorithm removes noise more cleanly and preserves more local details. Noise residues are more likely to occur in the traditional denoising methods, especially in scenes having low environmental illumination (for instance, nighttime, daytime cloudy days, etc.). That is, by using the deep learning network for AI denoising processing, the problems of large noise and detail smearing in the traditional denoising algorithm are solved, and the problem of large imaging noise caused by hardware limitations is further solved.

According to the above technical solution, the problems of blur, smear, ghost, etc. occurring when the subject with a high movement speed is photographed are solved, a user can be enabled to clearly capture a wonderful moment of the moving subject, clarity of the moving subject in imaging is guaranteed, and a yield of captured pictures is improved.

In some examples, before step S32, that is, before determining the blur, the method further includes: filtering out useless images by using focus information, so as to reduce the amount of blur computation.

Figure 4:
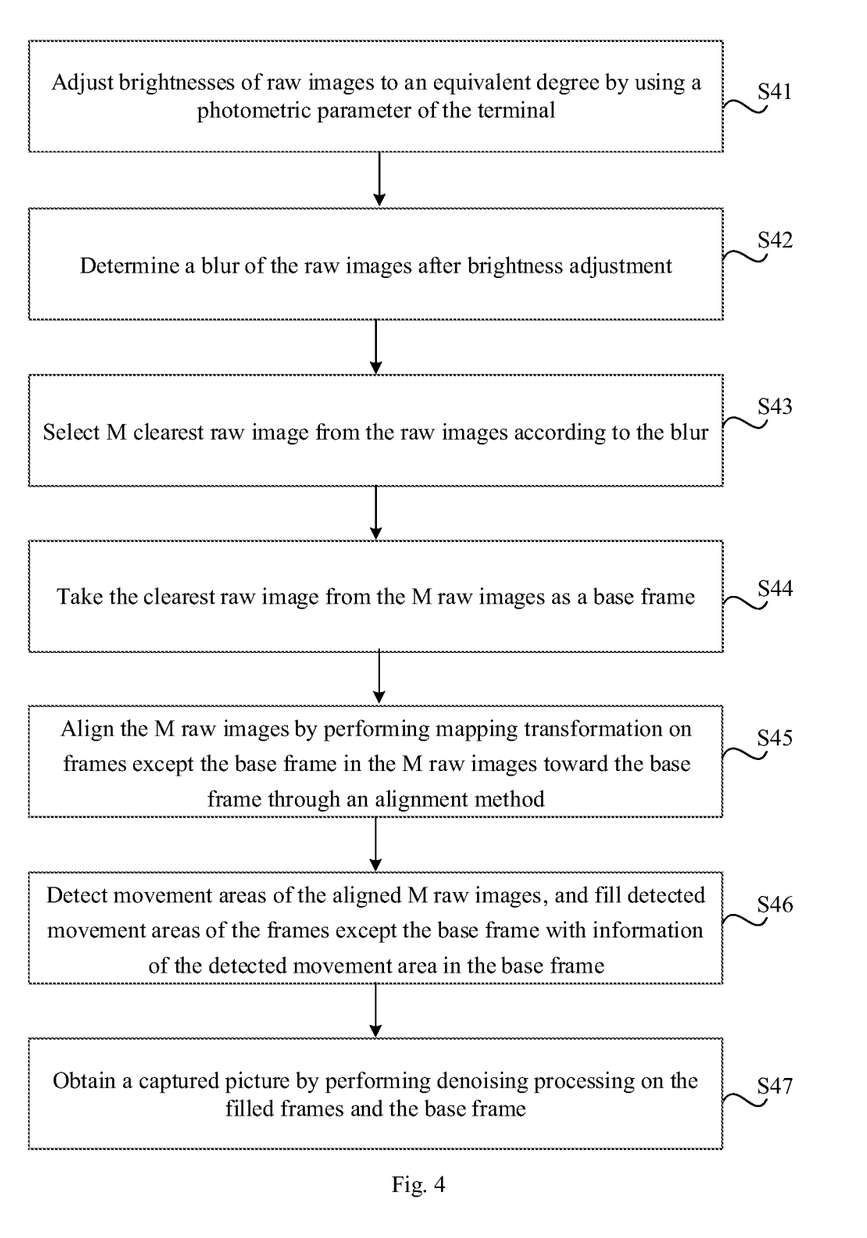
FIG. 4 is a flowchart showing multi-frame processing operation according to an example.

FIG. 4 is a flowchart showing multi-frame processing operation according to an example. As shown in FIG. 4, the multi-frame processing operation includes the following steps of S41 to S47.

In S41, brightnesses of the raw images are adjusted to an equivalent degree by using a photometric parameter of the terminal. For instance, the brightnesses of the raw images are adjusted by using a gain value in the photometric parameter. By adjusting the brightnesses of the raw images to an equivalent degree, a brightness difference between the raw images may be eliminated, and the accuracy of blur computation in the subsequent steps is improved.

In S42, a blur of the raw images after brightness adjustment is determined.

In some examples, the blur may be determined by means of various algorithms, for instance, through a feature-pyramid-based blur computation method, a gradient-change-based blur computation method, a deep-learning-method-based blur computation method, etc. The gradient-change-based blur computation method refers to the computation of gradient changes in the raw images and the determination of the blur based on the gradient changes. In response to determining that an image contains more gradient changes, it means that the image contains more edge information, and the more the edges are defined, the clearer the image is. Compared with the gradient-change-based blur computation method, the computation result of the feature-pyramid-based blur computation method is more accurate. The deep-learning method-based blur computation method may return image clarity.

In S43, M clearest raw images are selected from the raw images according to the blur, where M is a positive integer greater than or equal to 2. By selecting frames based on the blur, a frame with a minimum blur value may be accurately selected, and the entire clarity of the captured pictures may be guaranteed.

In S44, the clearest raw image from the M raw images is taken as a base frame.

In S45, the M raw images are aligned by performing a mapping transformation on frames except the base frame in the M raw images toward the base frame through an alignment method.

In some examples, the alignment method may be a method of combining global alignment and optical flow alignment. For instance, global alignment is performed first, and then optical flow alignment is performed, or optical flow alignment is performed first, and then global alignment is performed, so as to improve the accuracy of alignment and reduce negative problems of distortion of repeated textures caused by alignment. Alternatively, the alignment method may be an alignment method based on deep learning, and the alignment method based on deep learning may generate a more accurate optical flow graph, such that a texture of an alignment result is clearer and finer.

In S46, movement areas of the aligned M raw images are detected, and detected movement areas of the frames, except the base frame, are filled with information of the detected movement area in the base frame. Since a moving subject exists in the photographed scene, the moving subject in each image of the M raw images is located at different positions in the images, and smear and ghost may be removed by filling the detected movement areas of the frames, except for the base frame, with the information of the detected movement area in the base frame.

In S47, the captured picture is obtained by performing denoising processing on the filled frames and the base frame. That is, one captured picture is obtained by using M raw images.

In some examples, various denoising processing methods may be used. For instance, a deep learning network is used for AI denoising processing. Compared with a traditional denoising method, the AI denoising algorithm removes noise more cleanly, and preserves more local details. Noise residues are more likely to occur in the traditional denoising methods, especially in scenes having low environmental illumination (for instance, nighttime, daytime cloudy days, etc.). That is, by using the deep learning network for AI denoising processing, the problems of large noise and detail smearing in the traditional denoising algorithm are solved, and the problem of large imaging noise caused by hardware limitations is further solved.

According to the above technical solution, the problems of blur, smear, ghost, etc. occurring when the subject with a high movement speed is photographed are solved, a user can be enabled to clearly capture a wonderful moment of the moving subject, clarity of the moving subject in imaging is guaranteed, and a yield of captured pictures is improved.

In some examples, before step S42, that is, before determining the blur, the method further includes: filtering out useless images by using focus information, so as to reduce the amount of blur computation.

In some examples, before the alignment operation in S45 is performed, the following operation may be further performed: determining area brightnesses corresponding to different areas of the raw images; and performing a self-adaptive brightening operation on an area having the area brightness lower than a third brightness, the third brightness being a threshold brightness tending to cause false alignment. That is, in response to determining that the area brightness of a certain area in the raw images is lower than the third brightness, which indicates that the brightness of the area is too low and texture deformation caused by false alignment is likely to occur, the brightness of the area is increased by performing the self-adaptive brightening operation on the area, so as to basically align pixels in non-moving areas (that is, areas without the moving photographed subject) of the selected M raw images, improving the accuracy of alignment.

Figure 5:
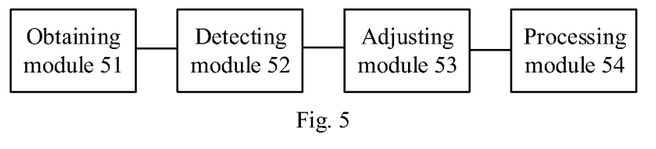
FIG. 5 is a schematic block diagram of a photographing apparatus according to an example.

FIG. 5 is a schematic block diagram of a photographing apparatus according to an example. The photographing apparatus may be used in any terminal with a photographing function, for instance, a mobile phone, a tablet computer, an iPad, etc. As shown in FIG. 5, the photographing apparatus includes: an obtaining module 51 configured to obtain a preview stream; a detecting module 52 configured to detect a movement speed of a photographed subject according to the preview stream; an adjusting module 53 configured to obtain a first exposure time by shortening, according to the movement speed, an initial exposure time for preview frames in the preview stream in response to determining that the movement speed is higher than a preset speed threshold; and a processing module 54 configured to capture a picture by using the first exposure time.

According to the above technical solution, in the case that the movement speed of the photographed subject is higher than the preset speed threshold, which indicates that the current movement speed of the photographed subject is high, the initial exposure time for the preview frames in the preview stream is shortened according to the movement speed, so as to guarantee that the subject in the picture is clear, thus, the problems of blur, smear, ghost, etc. occurring when the subject with a high movement speed is photographed are solved, a user is enabled to clearly capture a wonderful moment of the moving subject, clarity of the moving subject in imaging is guaranteed, and a yield of captured pictures is improved. Moreover, compared with a solution for prolonging a shutter time in the related art, the disclosure shortens the exposure time, so as to avoid jitter under a long exposure time (for instance, a too long exposure time is liable to cause hand tremble during handheld photographing), further a clearer output picture may be obtained, and the yield of the captured pictures is improved. The method according to the examples of the disclosure is suitable for improving the quality of the captured picture in various environments, for instance, a scene with high ambient brightness (for instance, sunny days), a scene with low ambient brightness (for instance, nighttime, daytime cloudy days), etc.

In an example, detecting the movement speed of the photographed subject according to the preview stream includes: determining a change between the preview frames; and determining the movement speed of the photographed subject based on the change. Alternatively, detecting the movement speed of the photographed subject according to the preview stream includes: evaluating a movement state of the photographed subject in the preview frames through a deep learning method; and determining the movement speed of the photographed subject based on the evaluation result.

In an example, determining the movement speed of the photographed subject based on the change includes: determining the movement speed of the photographed subject based on the changes and weights corresponding to different areas of the preview frames, where a weight corresponding to areas, having the photographed subject, of the preview frames is larger than a weight corresponding to areas, having no photographed subject, of the preview frames.

In an example, the detecting module 52 is further configured to obtain a final movement speed by smoothing the movement speeds determined based on N consecutive preview frames.

In an example, before determining the change between the preview frames, the detecting module 52 is further configured to: determine area brightnesses corresponding to different areas of the preview frames; and perform a self-adaptive brightening operation on an area having the area brightness lower than a second brightness, the second brightness being a threshold brightness tending to cause false detection of the movement speed.

In an example, shortening, according to the movement speed, the initial exposure time for the preview frames in the preview stream includes: shortening the initial exposure time according to a preset corresponding relationship between the movement speed and the exposure time.

In an example, capturing the picture based on the first exposure time includes: obtaining raw images by using the first exposure time; and obtaining the captured picture by processing the raw images based on a brightness range in which the current ambient brightness falls and whether a current scene is an abnormal scene that causes differences between the raw images.

In an example, processing the raw images based on the brightness range in which the current ambient brightness falls and whether the current scene is the abnormal scene that causes differences between the raw images includes: determining the brightness range in which the current ambient brightness falls, and determining whether the current scene is the abnormal scene that causes differences between the raw images, where the brightness range includes a first brightness range and a second brightness range, the ambient brightness in the first brightness range is greater than the ambient brightness in the second brightness range, the first brightness range refers to a brightness range in which enough details can be restored from one raw image obtained under the condition that the current ambient brightness is in the first brightness range, and the second brightness range refers to a brightness range in which enough details cannot be restored from one raw image obtained under the condition that the current ambient brightness is in the second brightness range; processing the raw images by using single-frame processing operation in response to determining that the current scene is the abnormal scene, where the single-frame processing operation refers to operation of selecting one frame from the raw images for processing; processing the raw images by using the single-frame processing operation in response to determining that the current scene is not the abnormal scene and the current ambient brightness is in the first brightness range; and processing the raw images by using a multi-frame processing operation in response to determining that the current scene is not the abnormal scene and the current ambient brightness is in the second brightness range, where the multi-frame processing operation refers to operation of selecting more than one frame from the raw images for processing.

In an example, the abnormal scene includes at least one of a brightness sudden-change scene and a jitter scene, the brightness sudden-change scene referring to a scene at which a brightness difference between the raw images is greater than a preset brightness difference, and the jitter scene referring to a scene at which a terminal jitters.

In an example, the processing module 54 is further configured to determine a mean brightness of a middle area of each raw image, and take the mean brightness as a brightness of each raw image.

In an example, the processing module 54 is further configured to obtain angular speed information of a movement sensor of the terminal, and determine whether the terminal jitters based on the angular speed information.

In an example, the single-frame processing operation includes: adjusting brightnesses of the raw images to an equivalent degree by using a photometric parameter of the terminal; determining a blur of the raw images after brightness adjustment; selecting a clearest raw image from the raw images according to the blur; and obtaining the captured picture by performing denoising processing on the selected raw image.

In an example, the multi-frame processing operation includes: adjusting brightnesses of the raw images to an equivalent degree by using a photometric parameter of the terminal; determining a blur of the raw images after brightness adjustment; selecting M clearest raw images from the raw images according to the blur, where M is a positive integer greater than or equal to 2; taking the clearest raw image from the M raw images as a base frame; aligning the M raw images by performing mapping transformation on frames except the base frame in the M raw images toward the base frame through an alignment method; detecting movement areas of the aligned M raw images, and filling detected movement areas of the frames except the base frame with information of the detected movement area in the base frame; and obtaining the captured picture by performing denoising processing on the filled frames and the base frame.

In an example, the alignment method is a method combining global alignment and optical flow alignment, or a deep learning based alignment method.

In an example, before alignment, the processing module 54 is further configured to: determine area brightnesses corresponding to different areas of the raw images; and perform a self-adaptive brightening operation on an area having the area brightness lower than a third brightness, the third brightness being a threshold brightness tending to cause false alignment.

In an example, determining the blur of the raw images after brightness adjustment includes: determining the blur of the raw images after brightness adjustment through at least one of a feature-pyramid-based blur computation method, a gradient-change-based blur computation method, and a deep-learning-method-based blur computation method.

In an example, before determining the blur, the processing module 54 is further configured to filter out useless images by using focus information.

In an example, the denoising processing is artificial intelligence (AI) denoising processing.

With respect to the apparatus in the above examples, implementations in which the various modules execute operations have been described in detail in the examples relating to the method, and will not be described in detail here.

The disclosure further provides a non-transitory computer-readable storage medium storing a computer program instruction thereon, where when executed by a processor, the program instruction implements the steps of the photographing method provided in the disclosure.

The disclosure further provides a photographing apparatus, including: a processor, and a memory configured to store an instruction executable by the processor; where the processor is configured to execute steps of the method of the disclosure.

The disclosure further provides a chip, including a processor and an interface, where the processor is configured to read an instruction, to execute steps of the method provided in the disclosure.

Moreover, it is to be noted that the unit of brightness involved in the disclosure may be Lux index or other units of brightness. For the Lux index, the smaller the value is, the higher the brightness is represented. With an instance of "the ambient brightness is greater than the fourth brightness" mentioned above, assuming that a Lux index value of the fourth brightness is 290, a Lux index value of the ambient brightness is less than 290, so as to satisfy a requirement that the ambient brightness is greater than the fourth brightness.

Figure 6:
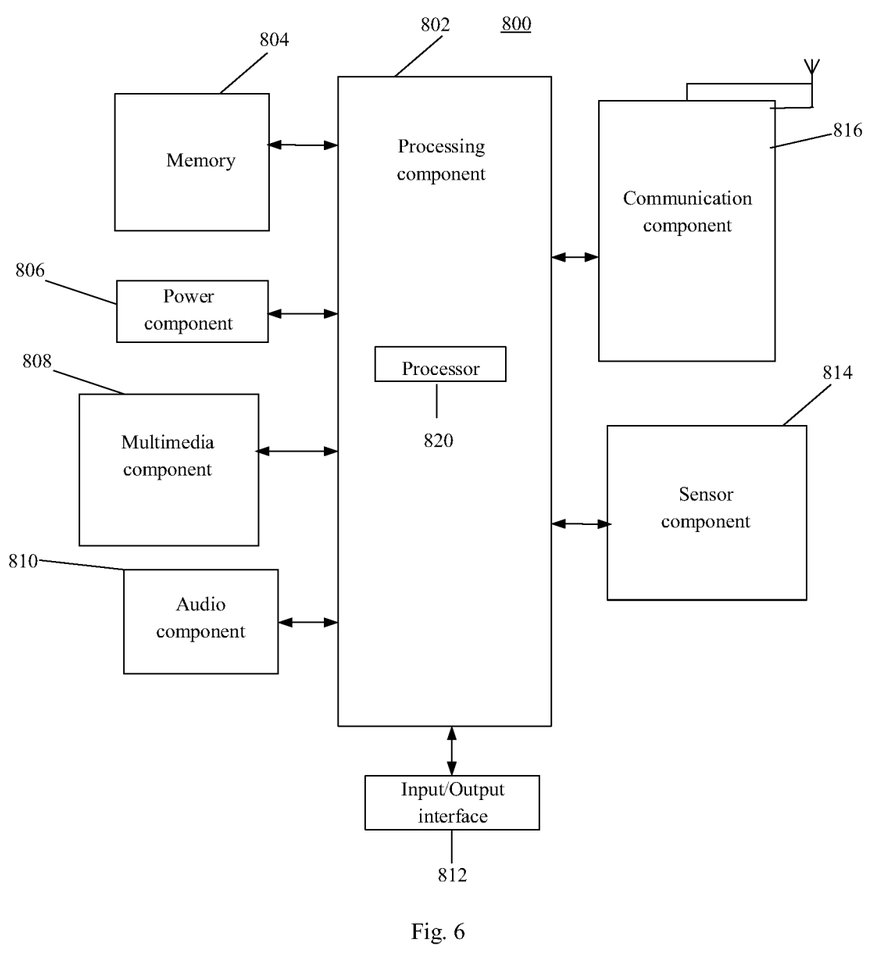
FIG. 6 is a block diagram of a photographing apparatus according to an example.

FIG. 6 is a block diagram of a photographing apparatus 800 according to an example. For instance, the apparatus 800 may be a mobile phone, a computer, a digital broadcast terminal, a messaging device, a gaming console, a tablet device, a medical device, a fitness device, a personal digital assistant, etc.

With reference to FIG. 6, the apparatus 800 may include one or more of a processing component 802, a memory 804, a power component 806, a multimedia component 808, an audio component 810, an input/output interface 812, a sensor component 814, and a communication component 816.

The processing component 802 generally controls overall operation of the apparatus 800, for instance, operations associated with display, phone calls, data communications, camera operations, and recording operations. The processing component 802 may include one or more processors 820 to execute an instruction to complete all or part of the steps of the photographing method above. Moreover, the processing component 802 may include one or more modules to facilitate interaction between the processing component 802 and other assemblies. For instance, the processing component 802 may include the multimedia module to facilitate interaction between the multimedia component 808 and the processing component 802.

The memory 804 is configured to store various types of data to support an operation on the apparatus 800. Instances of such data include an instruction, operated on the apparatus 800, for any application or method, contact data, phonebook data, messages, pictures, video, etc. The memory 804 may be implemented by any type of volatile or non-volatile memory, or their combination, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 provides power to various components of the device 800. The power component 806 may include a power management system, one or more power sources, and other components associated with generating, managing, and distributing power for the device 800.

The multimedia component 808 includes a screen that provides an output interface between the apparatus 800 and the user. In some examples, the screen may include a liquid crystal display (LCD) and a touch panel (TP). Under the condition that the screen includes the touch panel, the screen may be implemented as a touch screen to receive an input signal from the user. The touch panel includes one or more touch sensors to sense touches, slides, and gestures on the touch panel. The touch sensor may not only sense a boundary of a touch or swipe action, but also detect duration and pressure related to the touch or swipe operation. In some examples, the multimedia component 808 includes a front camera and/or a rear camera. When the apparatus 800 is in an operational mode, for instance, a photographing mode or a video mode, the front camera and/or the rear camera may receive external multimedia data. Each of the front camera and the rear camera may be a fixed optical lens system or have a focal length and optical zoom capability.

The audio component 810 is configured to output and/or input an audio signal. For instance, the audio component 810 includes a microphone (MIC) configured to receive an external audio signal when the apparatus 800 is in the operational mode, for instance, a calling mode, a recording mode, and a speech recognition mode. The received audio signal may be further stored in the memory 804 or sent via the communication component 816. In some examples, the audio component 810 further includes a speaker for outputting the audio signal.

The input/output interface 812 provides an interface between the processing component 802 and a peripheral interface module. The peripheral interface module may be a keyboard, a click wheel, a button, etc. These buttons may include, but are not limited to, a home button, a volume button, a start button, and a lock button.

The sensor component 814 includes one or more sensors for providing state assessments of various aspects for the apparatus 800. For instance, the sensor component 814 may detect an on/off state of the apparatus 800 and relative positioning of the assemblies. For instance, the assemblies are a display and a keypad of the apparatus 800. The sensor component 814 may also detect a change in position of the apparatus 800 or an assembly of the apparatus 800, the presence or absence of contact between the user and the apparatus 800, orientation or acceleration/deceleration of the apparatus 800, and temperature variation of the apparatus 800. The sensor component 814 may include a proximity sensor configured to detect presence of nearby objects in the absence of any physical contact. The sensor component 814 may also include a light sensor, for instance, a complementary metal oxide semiconductor (CMOS) or charge coupled device (CCD) image sensor, for use in imaging applications. In some examples, the sensor component 814 may also include an acceleration sensor, a gyroscopic sensor, a magnetic sensor, a pressure sensor, or a temperature sensor.

The communication component 816 is configured to facilitate communications between the apparatus 800 and other device in a wired or wireless mode. The apparatus 800 may access a wireless network based on a communication standard, for instance, WiFi, 2G, or 3G, or their combination. In an example, the communication component 816 receives a broadcast signal or broadcast related information from an external broadcast management system via a broadcast channel. In one example, the communication component 816 also includes a near field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth (BT) technology, or other technologies.

In the example, the apparatus 800 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the photographing method above.

In the example, there is further provided a non-transitory computer-readable storage medium including an instruction, for instance, a memory 804 including an instruction, and the instruction may be executed by the processor 820 of the apparatus 800 so as to execute the photographing method above. For instance, the non-transitory computer-readable storage medium may be a read-only memory (ROM), a random access memory (RAM), a compact disc read-only memory (CD-ROM), a magnetic tape, a floppy disk, an optical data storage apparatus, etc.

The above apparatus may be a part of a separate electronic device in addition to a separate electronic device, for instance, in one example, the apparatus may be an integrated circuit (IC) or a chip, where the integrated circuit may be an IC or a collection of a plurality of ICs; and the chip may include, but is not limited to, the following categories: a graphics processing unit (GPU), a central processing unit (CPU), a field programmable gate array (FPGA), a digital signal processor (DSP), an application specific integrated circuit (ASIC), a system on chip (SOC), etc. The above integrated circuit or chip may be used to execute an executable instruction (or code) to implement the photographing method above. The executable instructions may be stored on the integrated circuit or chip or retrieved from another apparatus or device, for instance, the integrated circuit or chip includes a processor, a memory, and an interface for communicating with another apparatus. The executable instruction may be stored in the memory, and the executable instruction implements the photographing method above when executed by a processor; and alternatively, the integrated circuit or chip may receive the executable instruction by means of the interface and transmit the executable instruction to the processor for execution to implement the photographing method above.

In another example, there is further provided a computer program product. The computer program product includes a computer program executable by a programmable apparatus, and the computer program has a code portion for executing the photographing method above when executed by the programmable apparatus.

Other examples of the disclosure will readily occur to those skilled in the art upon consideration of the specification and practice of the disclosure. The disclosure is intended to cover any variations, uses, or adaptations of the disclosure, and these variations, uses, or adaptations follow general principles of the disclosure and include common general knowledge or customary technical means in the technical field not disclosed in the disclosure. The specification and examples are considered as illustrative only, and a true scope and spirit of the disclosure are indicated by the following claims.

It is to be understood that the disclosure is not limited to the precise structure that has been described above and shown in the accompanying drawings, and that various modifications and changes may be made without departing from its scope. The scope of the disclosure is limited only by the appended claims.

What is claimed is:

1. A photographing method, comprising:
   obtaining a preview stream;
   detecting a movement speed of a photographed subject according to the preview stream;
   obtaining a first exposure time by shortening, according to the movement speed, an initial exposure time for preview frames in the preview stream, in response to determining that the movement speed is higher than a preset speed threshold; and
   capturing a picture based on the first exposure time,
   wherein detecting the movement speed of the photographed subject according to the preview stream comprises:
   determining a change between the preview frames, and determining the movement speed of the photographed subject based on the change; or
   evaluating a movement state of the photographed subject in the preview frames through a deep learning method, and determining the movement speed of the photographed subject based on an evaluation result, and
   wherein before determining the change between the preview frames, the method further comprises:
   determining area brightnesses corresponding to different areas of the preview frames, and
   performing a self-adaptive brightening operation on an area having an area brightness lower than a second brightness, the second brightness being a threshold brightness tending to cause false detection of the movement speed.

2. The method according to claim 1, wherein shortening, according to the movement speed, the initial exposure time for the preview frames in the preview stream comprises:
   shortening the initial exposure time according to a preset corresponding relationship between the movement speed and the first exposure time.

3. A chip, comprising a one or more processors and an interface, wherein the one or more processors is are collectively configured to read an instruction, to execute the method according to claim 1.

4. The method according to claim 1, wherein determining the movement speed of the photographed subject based on the change comprises:
   determining the movement speed of the photographed subject based on changes and weights corresponding to different areas of the preview frames, wherein a weight corresponding to areas, having the photographed subject, of the preview frames is larger than a weight corresponding to areas, having no photographed subject, of the preview frames.

5. The method according to claim 4, further comprising:
   obtaining a final movement speed by smoothing the movement speed determined based on N consecutive preview frames.

6. The method according to claim 1, wherein capturing the picture based on the first exposure time comprises:
   obtaining raw images by using the first exposure time; and obtaining a captured picture by processing the raw images based on a brightness range in which a current ambient brightness falls and whether a current scene is an abnormal scene that causes differences between the raw images, wherein the captured picture is the picture.

7. The method according to claim 6, wherein processing the raw images based on the brightness range in which the current ambient brightness falls and whether the current scene is the abnormal scene that causes differences between the raw images comprises:
determining the brightness range in which the current ambient brightness falls, and determining whether the current scene is the abnormal scene that causes differences between the raw images, wherein
the brightness range comprises a first brightness range and a second brightness range,
an ambient brightness within the first brightness range is greater than an ambient brightness within the second brightness range,
the first brightness range refers to a brightness range in which enough details can be restored from one raw image obtained under a condition that the current ambient brightness is in the first brightness range, and
the second brightness range refers to a brightness range in which enough details cannot be restored from one raw image obtained under a condition that the current ambient brightness is in the second brightness range;
processing the raw images by using a single-frame processing operation in response to determining that the current scene is the abnormal scene, where the single-frame processing operation refers to operation of selecting one frame from the raw images for processing;
processing the raw images by using the single-frame processing operation in response to determining that the current scene is not the abnormal scene and the current ambient brightness is in the first brightness range; and
processing the raw images by using a multi-frame processing operation in response to determining that the current scene is not the abnormal scene and the current ambient brightness is in the second brightness range, where the multi-frame processing operation refers to operation of selecting more than one frame from the raw images for processing.

8. The method according to claim 7, wherein the single-frame processing operation comprises:
adjusting brightnesses of the raw images to an equivalent degree by using a photometric parameter of a terminal;
determining a blur of the raw images after brightness adjustment;
selecting a clearest raw image from the raw images according to the blur; and
obtaining the captured picture by performing denoising processing on the clearest raw image.

9. The method according to claim 8, wherein before determining the blur, the method further comprises: filtering out useless images by using focus information.

10. The method according to claim 7, wherein the abnormal scene comprises at least one of a brightness sudden-change scene or a jitter scene, the brightness sudden-change scene referring to a scene at which a brightness difference between the raw images is greater than a preset brightness difference, and the jitter scene referring to a scene at which a terminal jitters.

11. The method according to claim 10, further comprising:
determining a mean brightness of a middle area of each raw image, and taking the mean brightness as a brightness of each raw image.

12. The method according to claim 10, further comprising:
obtaining angular speed information of a movement sensor of the terminal; and
determining whether the terminal jitters based on the angular speed information.

13. The method according to claim 7, wherein the multi-frame processing operation comprises:
adjusting brightnesses of the raw images to an equivalent degree by using a photometric parameter of a terminal;
determining a blur of the raw images after brightness adjustment;
selecting M clearest raw images from the raw images according to the blur, where M is a positive integer greater than or equal to 2;
taking a clearest raw image from the M clearest raw images as a base frame;
aligning the M clearest raw images, by performing mapping transformation on frames except the base frame in the M clearest raw images toward the base frame through an alignment method, to create aligned M raw images;
detecting movement areas of the aligned M raw images, and
filling detected movement areas of the frames, except the base frame, with information of the detected movement areas in the base frame; and
obtaining the captured picture by performing denoising processing on the filled frames and the base frame.

14. The method according to claim 13, wherein the alignment method is a method combining global alignment and optical flow alignment, or a deep learning-based alignment method.

15. The method according to claim 13, wherein before alignment, the method further comprises:
determining area brightnesses corresponding to different areas of the raw images; and
performing a self-adaptive brightening operation on an area having the area brightness lower than a third brightness, the third brightness being a threshold brightness tending to cause false alignment.

16. The method according to claim 13, wherein before determining the blur, the method further comprises: filtering out useless images by using focus information.

17. A photographing apparatus, comprising:
one or more processors, and
a memory configured to store processor-executable instructions;
wherein the one or more processors, when executing the processor-executable instructions, are collectively configured to:
obtain a preview stream;
detect a movement speed of a photographed subject according to the preview stream;
obtain a first exposure time by shortening, according to the movement speed, an initial exposure time for preview frames in the preview stream, in response to determining that the movement speed is higher than a preset speed threshold; and
capture a picture based on the first exposure time, wherein in detecting the movement speed of the photographed subject according to the preview stream, the one or more processors are further collectively configured to:
- determine a change between the preview frames, and determine the movement speed of the photographed subject based on the change; or
- evaluate a movement state of the photographed subject in the preview frames through a deep learning method, and determine the movement speed of the photographed subject based on an evaluation result, and wherein before determining the change between the preview frames, the one or more processors are further collectively configured to:
- determine area brightnesses corresponding to different areas of the preview frames, and
- perform a self-adaptive brightening operation on an area having an area brightness lower than a second brightness, the second brightness being a threshold brightness tending to cause false detection of the movement speed.

18. A non-transitory computer-readable storage medium storing a computer program instruction thereon, wherein the computer program instruction, when executed by one or more processors, causes the one or more processors to:
  obtain a preview stream;
  detect a movement speed of a photographed subject according to the preview stream;
  obtain a first exposure time by shortening, according to the movement speed, an initial exposure time for preview frames in the preview stream, in response to determining that the movement speed is higher than a preset speed threshold; and
  capture a picture based on the first exposure time, wherein in detecting the movement speed of the photographed subject according to the preview stream, the one or more processors are further collectively configured to:
- determine a change between the preview frames, and determine the movement speed of the photographed subject based on the change; or
- evaluate a movement state of the photographed subject in the preview frames through a deep learning method, and determine the movement speed of the photographed subject based on an evaluation result, and wherein before determining the change between the preview frames, the one or more processors are further collectively configured to:
- determine area brightnesses corresponding to different areas of the preview frames, and
- perform a self-adaptive brightening operation on an area having an area brightness lower than a second brightness, the second brightness being a threshold brightness tending to cause false detection of the movement speed.

* * * * *